US010306706B2

(12) United States Patent
Wang et al.

(10) Patent No.: US 10,306,706 B2
(45) Date of Patent: May 28, 2019

(54) SDN-BASED WIA-PA FIELD NETWORK/IPV6 BACKHAUL NETWORK JOINT SCHEDULING METHOD

(71) Applicant: Chongqing University of Posts and Telecommunications, Chongqing (CN)

(72) Inventors: Ping Wang, Chongqing (CN); Heng Wang, Chongqing (CN); Chang Zhang, Chongqing (CN)

(73) Assignee: CHONGQIN UNIVERSITY OF POSTS AND TELECOMMUNICATIONS, Chongqing (CN)

( * ) Notice: Subject to any disclaimer, the term of this patent is extended or adjusted under 35 U.S.C. 154(b) by 0 days.

(21) Appl. No.: 15/512,881

(22) PCT Filed: Nov. 15, 2016

(86) PCT No.: PCT/CN2016/105829
§ 371 (c)(1),
(2) Date: Mar. 21, 2017

(87) PCT Pub. No.: WO2018/086144
PCT Pub. Date: May 17, 2018

(65) Prior Publication Data
US 2018/0235026 A1 Aug. 16, 2018

(30) Foreign Application Priority Data
Nov. 8, 2016 (CN) .......................... 2016 1 0981753

(51) Int. Cl.
*H04L 12/28* (2006.01)
*H04W 84/20* (2009.01)
(Continued)

(52) U.S. Cl.
CPC ......... *H04W 84/20* (2013.01); *H04L 41/0806* (2013.01); *H04L 41/12* (2013.01);
(Continued)

(58) Field of Classification Search
USPC ................................. 370/252, 278, 329, 386
See application file for complete search history.

(56) References Cited

U.S. PATENT DOCUMENTS

| 2015/0207724 A1* | 7/2015 | Choudhury | ............. H04L 41/12 370/255 |
| 2016/0006672 A1* | 1/2016 | Saavedra | ................ H04L 49/00 370/401 |

(Continued)

*Primary Examiner* — John Pezzlo
(74) *Attorney, Agent, or Firm* — Anova Law Group, PLLC (57) ABSTRACT

The present invention relates to an SDN-based WIA-PA field network/IPv6 backhaul network joint scheduling method, which belongs to the technical field of industrial networks. Specific to the currently existing problems on data interaction among multiple WIA-PA networks and between the WIA-PA network and an IPv6 network, the method implements a scheduling function for a WIA-PA data stream in the IPv6 backhaul network and adds a joint control function for supporting a WIA-PA network manager in an SDN controller based on the IPv6 backhaul network according to the self-characteristics and application requirements of the WIA-PA network. The present invention not only implements the joint scheduling of a cross-network data stream for the IPv6 backhaul network and the WIA-PA network, but also enables the fine-grain recognition specific to the WIA-PA network data stream to implement the bandwidth guarantee for the end-to-end cross-network data stream.

7 Claims, 5 Drawing Sheets

(51) Int. Cl.
  *H04L 12/749* (2013.01)
  *H04W 72/12* (2009.01)
  *H04L 12/873* (2013.01)
  *H04L 12/24* (2006.01)
  *H04L 12/751* (2013.01)
  *H04L 12/863* (2013.01)
  *H04J 1/16* (2006.01)
  *H04L 29/12* (2006.01)

(52) U.S. Cl.
  CPC ............ *H04L 45/02* (2013.01); *H04L 45/741* (2013.01); *H04L 47/52* (2013.01); *H04L 47/6295* (2013.01); *H04W 72/121* (2013.01); *H04L 61/251* (2013.01); *H04L 61/6059* (2013.01)

(56) References Cited

U.S. PATENT DOCUMENTS

2016/0173385 A1* 6/2016 Isaksson ................. H04L 47/14
                                                                370/238
2017/0332420 A1* 11/2017 Cui ..................... H04L 61/2015

* cited by examiner

SDN-BASED WIA-PA FIELD NETWORK/IPV6 BACKHAUL NETWORK JOINT SCHEDULING METHOD

BACKGROUND OF THE INVENTION

Technical Field

The present invention belongs to the technical field of industrial networks, and relates to an SDN-based wireless networks for industrial automation process automation (WIA-PA) field network/IPv6 backhaul network joint scheduling method.

Description of Related Art

An industrial backhaul network is a transmission network located between a wide area network (for example, a wide area network based on an IPv6/IPv4 technology) and an industrial field network (for example, a WIA-PA network), and generally belongs to a medium-scale network. The industrial backhaul network based on the IPv6 technology conducting network addressing and transmitting with an IPv6 protocol to solve the transmission problems generated when the industrial field network accesses the IPv6/IPv4 wide area network or Internet.

The IPv6 technology is a new-generation network technology intended to solve a network address depletion problem encountered by the IPv4 network at present. With a huge network address space, an IPv6 network has a 128-bit address 4 times longer than an IPv4 address and offers 4-billion times more addresses than that offered by an IPv4 network. In the meantime, IPv6 is smaller in route table and higher in security, provides better support for multicasting and streaming and has an additional automatic network address configuration function. At present, it is an inevitable trend for the transition from IPv4 to IPv6.

The WIA-PA standard is a network standard developed to meet the urgent demands in the industrial network fields in China, and is also one of the three major international industrial wireless standards. A WIA-PA network based on the WIA-PA standard is a wireless sensing network capable of meeting the requirement for the production and operation of plants, and has the technical advantages of strong anti-jamming capability, high reliability, low consumption, ease for configuration, high flexibility and the like. Compared with the traditional industrial field network, the WIA-PA network has the benefits of low cost, ease of maintenance and use and the like, and stands for the future development direction of the industrial network field.

SDN, i.e. Software-Define-Network, is a new network architecture emerging in recent years. In this network, a control layer is separated from a forwarding layer and a forwarding device is controlled by the control layer. The SDN breaks the barriers of the traditional network device by separating the control plane and a data plane and opening a communication protocol. In addition, the open interface and the programmability also make the network management easier and more flexible.

Therefore, it is very necessary to use the SDN technology to solve the problem of the data interworking among multiple WIA-PA networks being unavailable, and to provide an SDN-based WIA-PA field network/IPv6 backhaul network joint scheduling method.

BRIEF SUMMARY OF THE INVENTION

In view of this, an object of the present invention is to provide an SDN-based WIA-PA field network/IPv6 backhaul network joint scheduling method. The method connects all the control systems in the whole network together through the SDN controller in combination with the self-characteristics and applications of the industrial IPv6 backhaul network to break the barriers among the wireless networks for industrial automation process automation (WIA-PA) networks from different areas, thereby implementing the seamless connection among all the WIA-PA networks.

To achieve the object above, the present invention provides a technical solution as follows:

an SDN-based WIA-PA field network/IPv6 backhaul network joint scheduling method, in which communication entities comprise a joint controller, WIA-PA network managers, gateways and field devices; the joint controller consists of an SDN controller and a joint scheduling plugin, WIA-PA networks are uniformly managed by the joint controller, and the WIA-PA network managers per se only reserve a basic management function; the joint controller assigns a personal area network identifier (PAN_ID) to each network manager connected thereto for identifying different WIA-PA networks; and the method specifically comprises the following steps:

S1: establishing a connection with the joint controller actively by the network managers existing in the networks;

S2: collecting information of the WIA-PA networks of which the network managers are in charge by the joint controller periodically;

S3: receiving and analyzing a business establishing request by the joint controller;

S4: looking up the PAN_ID of a network in which a source node is located and the PAN_ID of a network in which a destination node is located according to analyzed information;

S5: looking up the information of the corresponding networks and nodes according to the PAN_IDs and calculating as well as assigning paths and resources, by the joint controller;

S6: sending a path and resource configuration request to the corresponding network managers by the joint controller through interfaces;

S7: sending a mapping table of WIA-PA network addresses and IP addresses to the gateways of the corresponding networks by the joint controller through the interfaces;

S8: configuring the controlled IPv6 backhaul network according to calculated results of the paths and resources by the joint controller, wherein the business establishing is completed hereto.

Further, the joint controller generates a global network topology according to a WIA-PA network topology and an IPv6 network topology, and selects an appropriate path for transmission according to the global network topology when a cross-network data transmission task needs to be established.

Further, the joint controller assigns different VCR_IDs (i.e., virtual collection registry identifiers) and Route_IDs to data streams to be subjected to intra-network transmission and data streams to be subjected to cross-network transmission, and when the data streams reach the gateways, the gateways can rapidly distinguish whether the data streams need to be subjected to the cross-network transmission; and the joint controller assigns corresponding network resources to the data streams in the WIA-PA networks according to the type of the cross-network transmission data to guarantee the requirement of the cross-network transmission data.

Further, the joint controller is capable of recognizing different cross-network data streams in the IPv6-based IPv6 backhaul network and providing the same with corresponding bandwidth guarantees according to the type and priority of the data streams, and meanwhile, the joint controller supports the recognition of the data streams through the matching of IPv6/IPv4 head information; and the joint controller recognizes the data streams with a flow label domain of an IPv6 head and gets the types of the data streams through a communication type domain.

Further, when receiving cross-network data packets, the gateways convert WIA-PA data packets into IPv6 data packets which are transmitted to the IPv6 backhaul network; and in the conversion process, the gateways fill the corresponding VCR_IDs into the IPv6 flow label domains according to a VCR table, fill the priority into the communication type domains, and send the data packets to the corresponding IPv6 addresses through the IPv6 address mapping table.

Further, an SDN switch in the IPv6 backhaul network in the method sets queues having different bandwidths, and the joint controller forwards the data streams of different requirements to different queues to implement bandwidth guarantees.

Further, the interfaces for information interaction between the network managers and the joint controller in the method comprise, but are not limited to, the following 9 types: a topology information getting interface, a device information getting interface, a device list getting interface, a device upper airway obstruction (UAO) getting interface, a route table setting interface, a superframe table setting interface, a link table setting interface, a VCR setting interface, and an IPv6 address mapping table setting interface.

The present invention has the following advantageous effects.

1) Enable the end-to-end joint scheduling of the cross-network data streams. When a cross-network transmission business establishing request is received from a northbound interface, the joint controller plans the paths and resources appropriately according to the whole network information maintained thereby, and issues the planned contents to the corresponding network through the SDN controller and the WIA-PA network manager to implement the cross-network transmission business.

2) Enable the recognition of different types of cross-network data streams. In a process of transmitting the cross-network data streams from the interior of the WIA-PA network to the IPv6 backhaul network, the gateway converts a cross-network data packet into a corresponding IPv6 data packet according to the requirements of the joint controller, and simultaneously fills the data stream information into an IPv6 head. In the IPv6 backhaul network, the joint controller matches the corresponding IPv6 matching field to implement the recognition of different types of cross-network data streams.

3) Enable the bandwidth guarantee specific to different types of cross-network end-to-end data. By setting the port queues having different bandwidths in the SDN switch in the IPv6 backhaul network, the joint controller is capable of forwarding the recognized data streams having different requirements to the corresponding port queues. In the meantime, the joint controller can get the information of the flow to the corresponding port queue, and adjust the path and resource of the relevant data stream in the industrial backhaul network according to the real-time flow data, thereby implementing the bandwidth guarantee for the key data stream.

4) Enable the acceleration of cross-network business deployment and reduce the management cost for network operation and maintenance. With the SDN-based WIA-PA field network/IPv6 backhaul network joint scheduling method, the IPv6 backhaul network and the WIA-PA network are controlled and scheduled in a centralized manner. When a business establishment request is received, the business can be deployed directly by the joint controller without the use of other network management systems, thereby simplifying the flow process of the business deployment. In the meantime, with the SDN-based WIA-PA field network/IPv6 backhaul network joint scheduling method, the smart flow scheduling and network management is realized, the utilization ratio of the network links is greatly increased, and the management cost for network operation and maintenance is reduced.

BRIEF DESCRIPTION OF THE SEVERAL VIEWS OF THE DRAWINGS

To make the object, technical solution and beneficial effects of the present invention more clear, the present invention provides the following drawings for an illustrative purpose.

DETAILED DESCRIPTION OF THE INVENTION

The preferred embodiments of the present invention will be described below in detail in combination with the drawings.

In the SDN-based WIA-PA field network/IPv6 backhaul network joint scheduling method, both the IPv6-based IPv6 backhaul network and the WIA-PA network are controlled and scheduled in a centralized manner by a joint controller, with the specific implementation process as follows.

I. Illustration of Joint Network Scheduling Architecture

Figure 1:
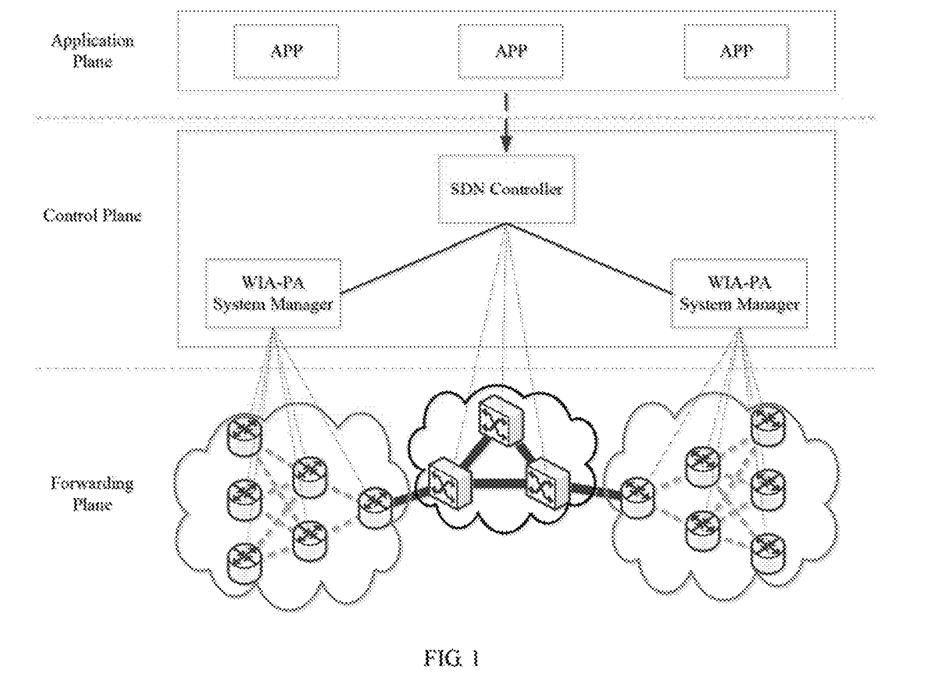
FIG. 1 is a diagram showing a joint network scheduling architecture.
Figure 6:
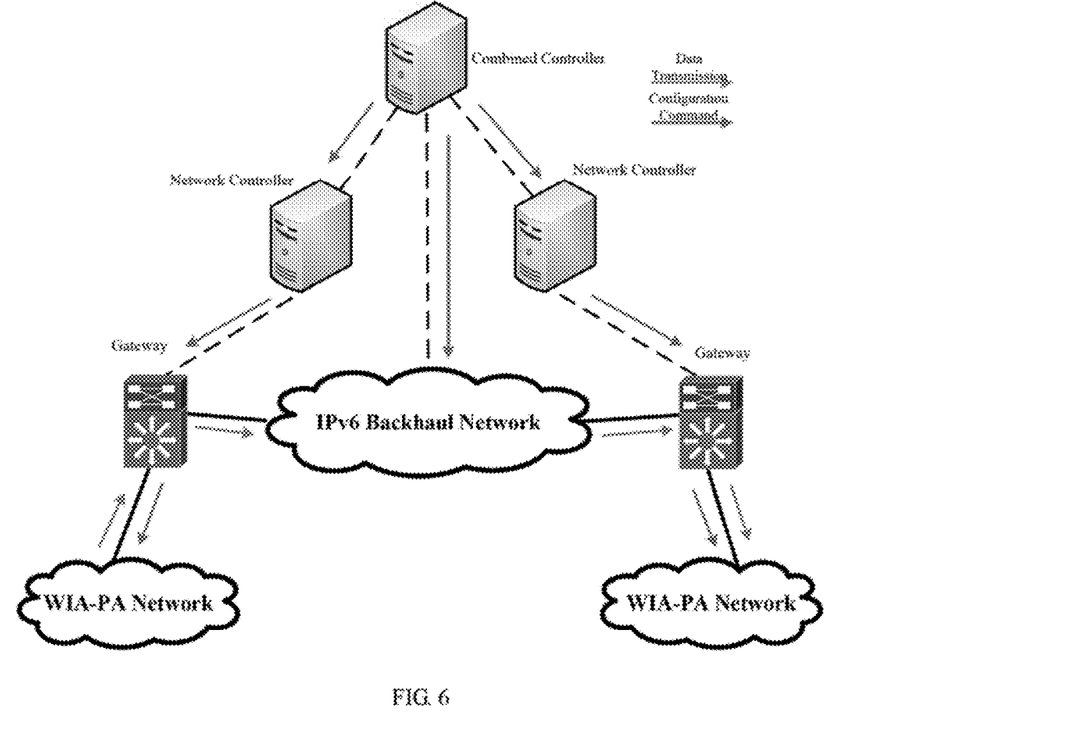
FIG. 6 is a schematic diagram showing joint scheduling.

FIG. 1 is a diagram showing a joint network scheduling architecture, which is optimized specific to the characteristics of the industrial network, so that a single SDN controller is capable of managing the whole industrial network in combination with the WIA-PA network manager and providing support for the scheduling of the data streams which are located in the WIA-PA networks from different areas and are subjected to cross-network transmission via the IPv6 backhaul network. FIG. 6 is a schematic diagram showing the joint scheduling.

The joint scheduling architecture is mainly divided into three planes, which are respective as follows:

(1) a forwarding plane, which includes various network devices distributed in the WIA-PA networks and the IPv6-based IPv6 backhaul networks and acts an physical entity for the whole network transmission. Generally speaking, these devices are specific implementers for the management and control operation;

(2) a control plane, which consists of the WIA-PA network managers and the SDN controller. The joint controller is integrated into the SDN controller in the form of plugins. Other WIA-PA network managers are subjected to the management of the joint controller by establishing connections with the SDN controller. In the meantime, the joint controller inside the SDN controller implements the management over the industrial backhaul network by directly calling a corresponding module of the SDN controller; and (3) an application plane, which provides a user with a uniform interface as to the joint scheduling, and meanwhile provides the user with an intuitive interface and shields raw network information.

When the application plane receives a primary cross-network business establishing request, the joint controller is capable of calculating path information and resource assignment information according to the stored information of each network and the business request from the application layer, and converting the same into an information type recognizable for the network manager according to preset WIA-PA network information.

II. Illustration of Joint Scheduling Flow Process

Figure 2:
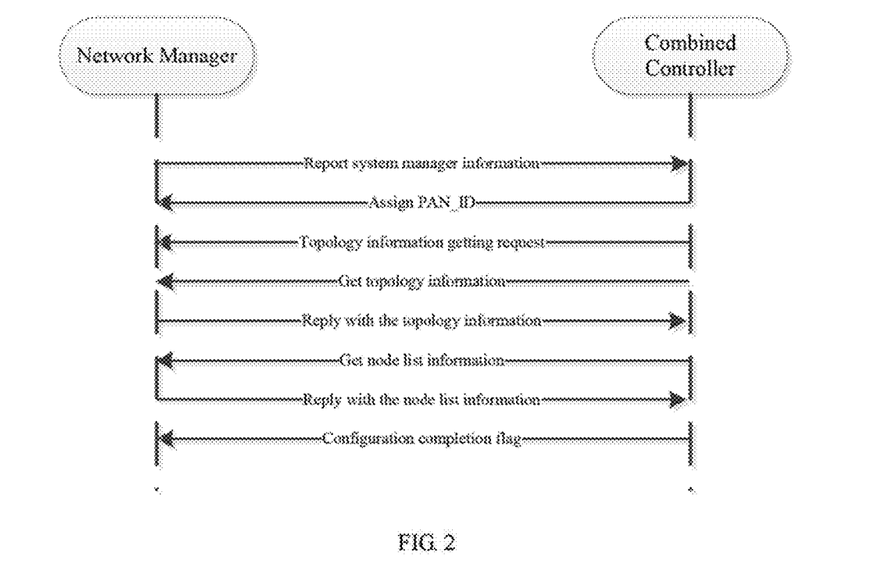
FIG. 2 is a flow diagram showing the network access of a network manager.

FIG. 2 is a flow diagram showing the network access of a network manager according to the present invention, with the specific steps as follows:

Step 1: establishing a connection with the joint controller actively by a WIA-PA network manager after startup and reporting network manager information;

Step 2: assigning one PAN_ID to the WIA-PA network and establishing a mapping relation between the PAN_ID and the connection, by the joint controller;

Step 3: sending a request for getting topology information and node information to the WIA-PA network manager by the joint controller;

Step 4: replying with the topology information and node information by the WIA-PA network manager;

Step 5: sending a configuration completion flag to the network manager by the joint controller to end a network access process.

Figure 3:
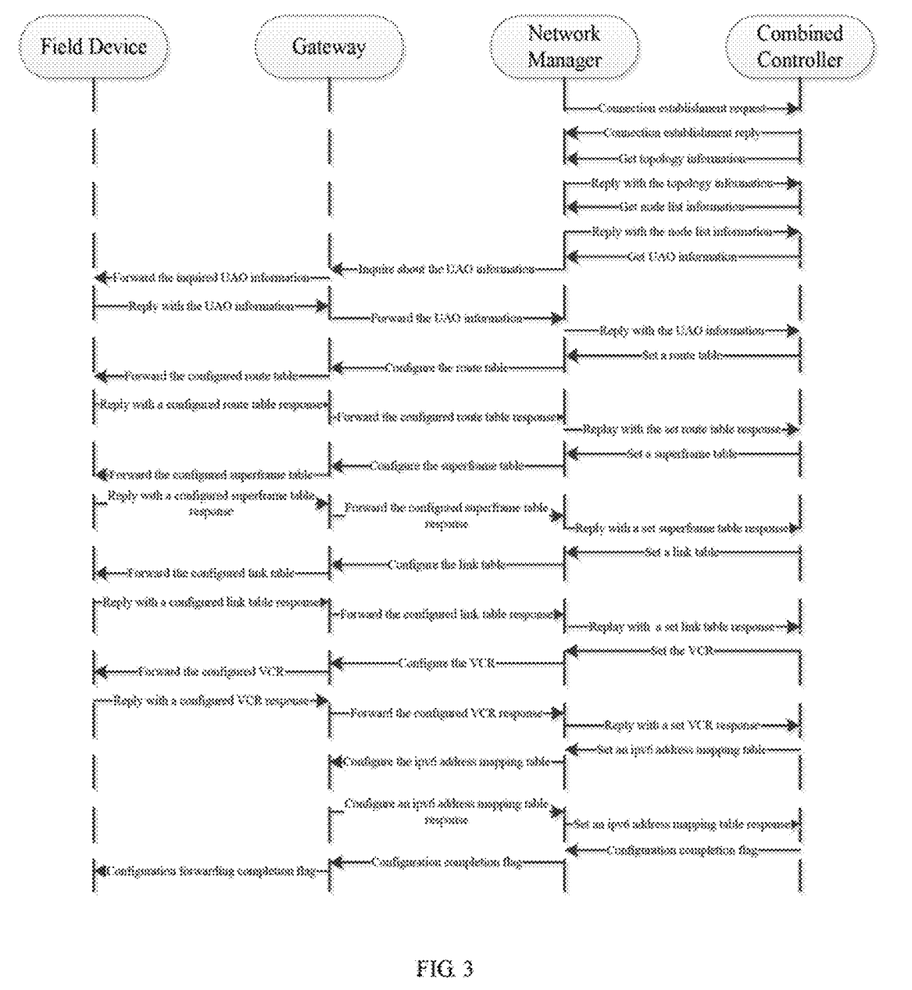
FIG. 3 is a flow diagram off a joint scheduling configuration.

FIG. 3 is a flow diagram showing the joint scheduling configuration according to the present invention, with the specific steps as follows:

Step 1: establishing a connection with the joint controller by a network manager actively to complete a network access process;

Step 2: sending a topology information getting request to the network manager by the joint controller;

Step 3: receiving the topology information getting information by the network manager which reports the topology information stored therein to the joint controller;

Step 4: sending a node list information getting request to the network manager by the joint controller;

Step 5: receiving the node list information getting request by the network manager which directs reports the node information stored therein to the joint controller;

Step 6: after getting node list information successfully, sending a node UAO information getting request to the network manager by the joint controller according to the node information;

Step 7: receiving the node UAO information getting request, sending a UAO information getting request to the node, and reporting the node UAO information to the joint controller after receiving a reply, by the network manager;

Step 8: after getting the UAO information successfully, calculating an end-to-end transmission route for the cross-network data stream according to the topology information and the UAO information, and after receiving the request, sending the route as to the WIA-PA network to the network manager, by the joint controller;

Step 9: after route configuration is completed for a field device, sending a route configuration response to the network manager which reports the route configuration response to the joint controller;

Step 10: after completing a route configuration, sending a corresponding superframe table and a link table to the network manager through a superframe configuration request and a link table configuration request by the joint controller, and after receiving the requests, sending a superframe configuration request and a link configuration request to the field device by the network manager;

Step 11: after completing the configuration of the superframe and link, sending a configuration response to the network manager by the field device, and reporting the configuration response to the joint controller by the network manager;

Step 12: after completing the configuration above, sending a corresponding VCR to the network manager through a VCR configuration request by the joint controller, and after receiving the request, sending a VCR configuration request to the field device and gate way by the network manager;

Step 13: after the field device completes the VCR configuration and the gateway records this VCR, sending a VCR configuration response to the network manager, and reporting the VCR configuration response to the joint controller by the network manager, in sequence;

Step 14: after completing VCR configuration, sending a corresponding Route_ID and IPv6 address mapping table to the network manager through a mapping configuration request by the joint controller, and after receiving the request, sending a mapping configuration request to the gateway by the network manager;

Step 15: after completing mapping configuration, sending a mapping configuration response to the network manager by the gateway, and reporting the mapping configuration response to the joint controller by the network manager;

Step 16: after completing mapping table configuration, sending a communication resource configuration completion command to the network manager by the joint controller, and after the network manager receiving the command, sending a communication resource configuration completion flag to the field device by the network manager;

Step 17: after receiving the communication resource configuration completion flag, running according to a new communication resource and returning a corresponding response to the network manager by the field device. The joint scheduling of the WIA-PA networks is completed hereto, and the transmission of the cross-network data begins.

Figure 4:
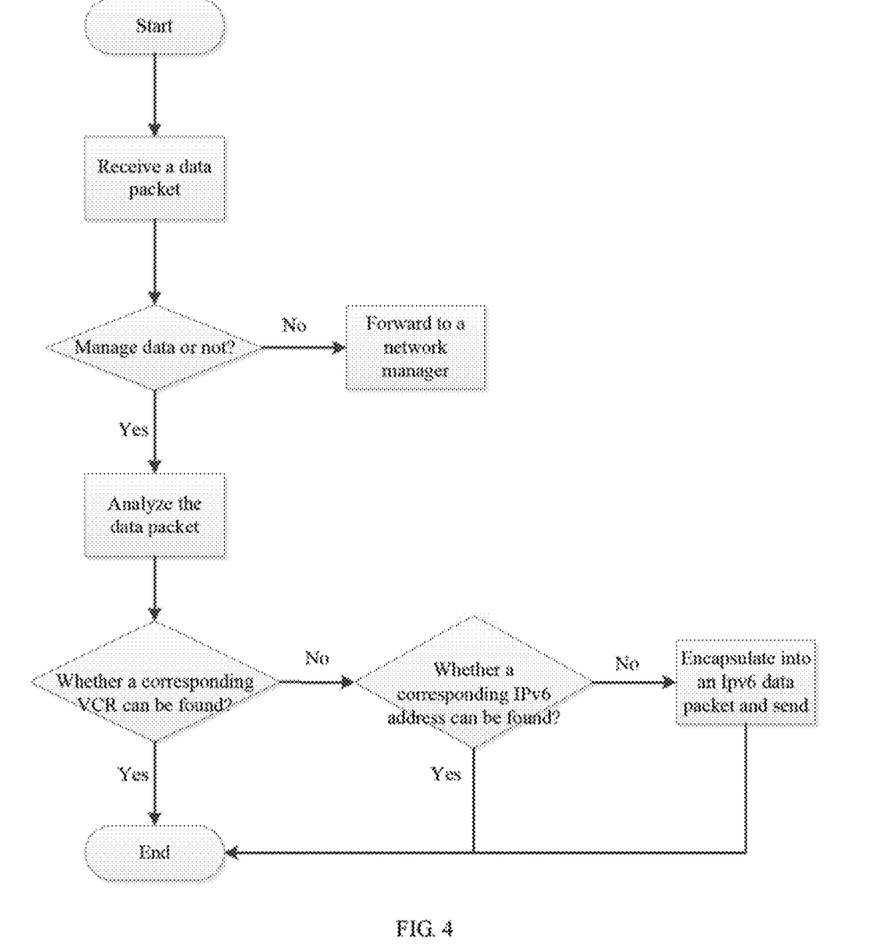
FIG. 4 is a flow diagram showing gateway protocol conversion.

FIG. 4 is a flow diagram showing gateway protocol conversion according to the present invention, with the specific steps as follows:

Step 1: receiving a data packet and judging whether the data packet is management data by a gateway;

Step 2: If so, forwarding the data packet to the network manager, if not, analyzing to obtain Route_ID, ObjectID and InstanceID in the data packet, and looking up a corresponding VCR in a VCR table according to these information;

Step 3: after finding the corresponding VCR, looking up an IPv6 address of a corresponding target domain gateway in the IPv6 address mapping table according to Route_ID by the gateway;

Step 4: beginning to encapsulate the WIA-PA data packet in an IPv6 format by the gateway, filling the VCR_ID into a flow label domain at an IPv6 head, and filling the priority of the WIA-PA data packet into a communication type domain at the IPv6 head, with zero filling other extra bytes.

Figure 5:
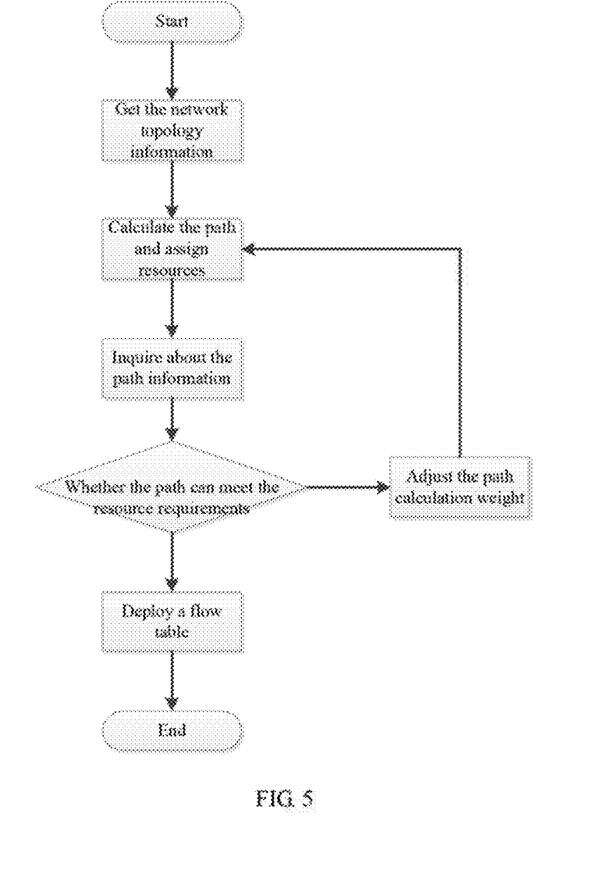
FIG. 5 is a flow diagram showing the bandwidth guarantee for an IPv6 backhaul network.

FIG. 5 is a flow diagram showing bandwidth guarantee of the IPv6 backhaul network according to the present invention, with the specific steps as follows:

Step 1: receiving a business establishment request and then calculating path information and network resource assignment by the joint controller;

Step 2: verifying whether a bandwidth in the path is sufficient for meeting a business requirement by the joint controller through an internal module of the SDN controller;

Step 3: if so, deploying a flow table through the SDN controller, and directing a data stream to a corresponding priority queue by using the flow table to match the priority of the VCR_ID and IPv6 communication type domain; and Step 4: if not, recalculating the path information and resource assignment as to the industrial backhaul network and selecting other secondary paths for transmitting the data stream.

III. Design of Joint Scheduling Interface

In an original WIA-PA network, the network manager as a network administrator is in charge of the management of the WIA-PA network and the device attribute thereof in a centralized management manner. Therefore, the original WIA-PA network manager has no interface to be called by other applications. However, to manage the WIA-PA network manager by the joint controller and conduct joint scheduling on the WIA-PA network by the network manager, the network manager needs to provide an API interface to the joint controller so that the joint controller can complete the configuration flow of the joint scheduling by calling the interface of the network manager.

The interface of the network manager of the WIA-PA network is mainly designed in two parts, in one part, the functions of the original network manger are extended based on the original network manager to act as the interfaces offered to other applications; and in the other part, a new function is added to the network manager according to the requirement of the joint controller.

The design cases of the joint scheduling interfaces are as follows.

1. Get Topology Information

A topology information getting interface is an interface newly added according to the requirement of the joint controller. The joint controller can get the topology information of the current WIA-PA network through the topology information getting interfaced. The joint controller needs to use a GET method in the HTTP protocol when calling this interface. URI is positioned for the topology information, the position of which is described in a format as follows:

/network-topology

A resource representation form received by the joint controller needs to be clearly indicated in an Accept domain at the head of the HTTP protocol. In the meantime, it is also necessary to add the base64 encoding of a user name and a password into an Authentication domain. A complete message for calling the topology information getting interface is as follows:

```
GET /network-topology HTTP/1.1
Accept: application/xml
Authentication:
Content-Length:0
```

After receiving a command, the network manager converts the topology information into an XML format and sends the same to the joint controller. The HTTP head of the message of a reply message is simpler, and can be obtained just by adding an HTTP status code according to the command execution condition of the network manager. A complete reply message for the topology information getting is as follows, where UFT means unicode transformation format:

```
HTTP/1.1 200/OK
Content-Type: application/xml
Accept: application/xml
Authentication:
Content-Length:
<?xml version="1.0" encoding="UTF-8" standalone="no"?>
<topology xmlns="cquptSDN:network-topology">
    <num>totaledgenumber</num>
    <edge>
        <src>nodetype|nodeshortaddress</src>
        <dst>nodetype|nodeshortaddress</dst>
        <LinkQuality></LinkQuality>
    </edge>
</topology>
```

2. Get Device Information

The joint controller can get a structured attribute of the field device through a short address by calling the device information getting interface. The joint controller needs to use a GET method in the HTTP protocol when calling this interface. The device information is positioned with an URI in a manner of the device short address and the device attribute name, if the attribute name is empty, the network manager reports all the attributes of the device to the joint controller. A complete message for calling the device information getting interface is as follows:

```
GET /device/shortaddress/info HTTP/1.1
Accept: application/xml
Authentication:
Content-Length:
<?xml version="1.0" encoding="UTF-8" standalone="no"?>
<device xmlns="cquptSDN:device">
    <num>attributenamenumber</num>
    <name>longaddress</name>
    <name>shortaddress</name>
    <name>manufacturerID</name>
    <name>serialnumber</name>
    <name>devicestate</name>
</device>
```

After receiving the command, the network manager extracts the short address in the URI and then sends an attribute lookup command to the field device according to the short address and attribute name in the URI. After receiving a reply from the field device, the network manager stores the attribute name and an attribute value in XML and reports the same to the joint controller. A complete reply message for the device information getting is as follows:

```
HTTP/1.1 200/OK
Content-Type: application/xml
Accept: application/xml
Authentication:
Content-Length:
<?xml version="1.0" encoding="UTF-8" standalone="no"?>
<device xmlns="cquptSDN:device">
    <num>attributenumber</num>
    <longaddress>devicelongaddress</longaddress>
    <shortaddress>deviceshortaddress</shortaddress>
    <manufacturerID>manufacturerID</manufacturerID>
```

```
        <serialnumber>deviceserialnumber</serialnumber>
        <devicestate>devicestate</devicestate>
    </device>
```

3. Get Device List

The joint controller gets a list of all the online field devices in the WIA-PA network by calling the device list getting interface. The joint controller needs to use a GET method in the HTTP protocol when calling this interface. A complete message for calling the device list getting interface is as follows:

```
              GET /device/ HTTP/1.1
              Accept: application/xml
              Authentication:
              Content-Length:0
```

The network manager stores the long address, short address and device status of the field device into the XML according to the field device list stored therein and reports the same to the joint controller. A complete reply message for the device list getting is as follows:

```
HTTP/1.1 200/OK
Content-Type: application/xml
Accept: application/xml
Authentication:
Content-Length:
<?xml version="1.0" encoding="UTF-8" standalone="no"?>
<devicelistxmlns="cquptSDN:devicelist">
    <num>fielddevicenumber</num>
    <device>
        <longaddress>fielddevicelongaddress</longaddress>
        <shortaddress>fielddeviceshortaddress</shortaddress>
        <state>fielddevicestate</state>
    </device>
    <device>
        <longaddress>fielddevicelongaddress</longaddress>
        <shortaddress>fielddeviceshortaddress</shortaddress>
        <state>fielddevicestate</state>
    </device>
</devicelist>
```

4. Get Device UAO

The joint controller gets the UAO of a corresponding field device in the WIA-PA network by calling the device UAO getting interface. The joint controller needs to use a GET method in the HTTP protocol when calling this interface. The called URI is used for locating according to the short address of the field device. A complete message for calling the device UAO getting interface is as follows:

```
           GET /device/shortaddress/uao HTTP/1.1
           Accept: application/xml
           Authentication:
           Content-Length:0
```

After receiving the command, the network manager extracts the short address in the URI, and then sends a UAO lookup command to the field device according to the short address in the URI. After receiving a reply from the field device, the network manager stores the UAO information in the XML and reports the same to the joint controller.

A complete reply message for the device UAO getting is as follows:

```
HTTP/1.1 200/OK
Content-Type: application/xml
Accept: application/xml
Authentication:
Content-Length:
<?xml version="1.0" encoding="UTF-8" standalone="no"?>
<uaolistxmlns="cquptSDN:uao list">
    <num>UAOnumber</num>
    <uao>
        <objectID>objectID</objectID>
        <instanceID>instanceID</instanceID>
        <profileID>UAOlinediscipline</profileID>
        <parameternum>parameternumber</parameternum>
    </uao>
    <uao>
        <objectID>objectID</objectID>
        <instanceID>instanceID</instanceID>
        <profileID>UAOlinediscipline</profileID>
        <parameternum>parameternumber</parameternum>
    </uao>
</uaolist>
```

5. Set Route Table

In the joint scheduling process, the joint controller delivers the well assigned path information to the network manager by calling the route table setting interface. The joint controller calls the interface by using a PUT method in the HTTP protocol. The called URI is used for locating according to the short address and Route of the field device. A complete message for calling the route table setting interface is as follows:

```
PUT /device/shortaddress/routetable HTTP/1.1
Content-Type: application/xml
Authentication:
Content-Length:
<?xml version="1.0" encoding="UTF-8" standalone="no"?>
<routetablexmlns="cquptSDN:routetable">
    <num>routetableentrynumber</num>
    <route>
        <ID>Route_ID</ID>
        <src>sourceaddress</src>
        <dst>destinationaddress</dst>
        <nexthop>nexthopaddress</nexthop>
        <retrycounter>endtoendretransmissioncounter</retrycounter>
    </route>
</routetable>
```

After receiving the request, the network manager extracts the short address in the URI and then sends a route table configuration command to the corresponding field device. After receiving a configuration response replied by the field device, the network manager reports configuration completion information to the joint controller. A complete completion message for the route table setting is as follows:

```
              HTTP/1.1 200/OK
              Content-Type: application/xml
              Authentication:
              Content-Length:0
```

6. Set Superframe Table

After completing the route table configuration, the joint controller sends a superframe table to the network manager in a manner of calling the superframe table setting interface. The joint controller calls the interface by using the PUT method in the HTTP protocol. The called URI is used for locating according to the short address and the Superframe of the field device. A complete message for calling the superframe table setting interface is as follows:

```
PUT /device/shortaddress/superframe HTTP/1.1
Content-Type: application/xml
Authentication:
Content-Length:
<?xml version="1.0" encoding="UTF-8" standalone="no"?>
<superframetablexmlns="cquptSDN:superframetable ">
    <num>superframetableentrynumber</num>
    <superframe>
        <ID>superframeID</ID>
        <multiple>ratioofdataupdateperiodtomaximumperiod</multiple>
        <numberslots>superframesize</numberslots>
        <activeflag>superframeactivationflag</activeflag>
        <activeslot>absoluteslotnumber</activeslot>
    </superframe>
</superframetable>
```

After receiving the request, the network manager extracts the short address in the URI and then sends a superframe table configuration command to the corresponding field device. After receiving the configuration response returned by the field device, the network manager reports the configuration completion information to the joint controller. A superframe table setting completion message is consistent with the route table setting completion message.

7. Set Link Table

After completing the superframe table configuration, the joint controller sends a link table to the network manager in a manner of calling the link table setting interface. The joint controller calls the interface by using the PUT method in the HTTP protocol. The called URI is used for locating according to the short address and the Link of the field device. A complete message for calling the link table setting interface is as follows:

```
PUT /device/shortaddress/link HTTP/1.1
Content-Type: application/xml
Authentication:
Content-Length:
<?xml version="1.0" encoding="UTF-8" standalone="no"?>
<linktablexmlns="cquptSDN:linktable">
    <num>linktableentrynumber</num>
    <link>
        <ID>linkID</ID>
        <neighborID>neighbordeviceID</neighborID>
        <linktype>linktype</linktype>
        <relativeslotnumber>relativeslotnumber</relativeslotnumber>
        <linksuperframenum>dataupdateratio</linksuperframenum>
        <activeflag>activeflag</activeflag>
        <channelindex>channelnumber</channelindex>
        <superframeID>superframeID</superframeID>
    </link>
</linktable>
```

After receiving the request, the network manager extracts the short address in the URI and then sends a link table configuration command to the corresponding field device. After receiving the configuration response returned by the field device, the network manager reports the configuration completion information to the joint controller. A link table setting completion message is consistent with the route table setting completion message.

8. Set VCR

After completing the link table configuration, the joint controller sends a VCR to the network manager in a manner of calling the VCR setting interface. The joint controller calls the interface by using the PUT method in the HTTP protocol. The called URI is used for locating according to the short address of the field device. A complete message for calling the VCR setting interface is as follows:

```
PUT /device/shortaddress/VCR HTTP/1.1
Content-Type: application/xml
Authentication:
Content-Length:
<?xml version="1.0" encoding="UTF-8" standalone="no"?>
<vcrtablexmlns="cquptSDN:vcrtable">
    <num></num>
    <vcr>
        <ID>VCR_ID</ID>
        <type>VCRtype</type>
        <srcobjID>sourceobjectID</srcobjID>
        <srcobjinsID>sourceobjectinstanceID</srcobjinsID>
        <desobjID>destinationobjectID</desobjID>
        <desobjinsID>destinationobjectinstanceID</desobjinsID>
        <dataupdaterate>dataupdateperiod</dataupdaterate>
        <status>VCRstatus</status>
        <activationtime>VCRactivationtime</activationtime>
        <servicetime>VCRservicetime</servicetime>
        <sourcechaddress>sourcedeviceclusterheadnetworkaddress
        </sourcechaddress>
        <sourceaddress>sourcedevicenetwrokaddress</sourceaddress>
        <destinationaddress>destinationdeviceclusterheadnetworkaddress
        </destinationaddress>
        <securitypolicy>datapacketsecuritypolicy</securitypolicy>
        <routeID>Route_ID</routeID>
    </vcr>
</vcrtable>
```

After receiving the request, the network manager extracts the short address in the URI and then sends a VCR command to the corresponding field device. In the meantime, the network manager sends the received VCR to the gateway so that the gateway can maintain the VCR table to do a good preparation for the subsequent data conversion. After receiving the configuration response returned by the field device, the network manager reports configuration completion information to the joint controller. A VCR setting completion message is consistent with the route table setting completion message.

9. Set IPv6 Address Mapping Table

After completing the VCR configuration, the joint controller sends an IPv6 address mapping table to the network manager in a manner of calling the IPv6 address mapping table setting interface. The joint controller calls the interface by using the PUT method in the HTTP protocol. The called URI is used for locating according to the short address of the field device. A complete message for calling the IPv6 address mapping table setting interface is as follows:

```
PUT /device/shortaddress/ipv6table HTTP/1.1
Content-Type: application/xml
Authentication:
Content-Length:
<?xml version="1.0" encoding="UTF-8" standalone="no"?>
<ipv6table xmlns="cquptSDN: ipv6table ">
    <num></num>
    <ipv6>
        <ID>ipv6_ID</ID>
        <routeID>Route_ID</routeID>
        <srcipv6addr>sourceipv6address</srcipv6addr>
        <desipv6addr>destinationipv6address</desipv6addr>
    </ipv6>
</ipv6table>
```

After receiving the request, the network manager extracts the short address in the URI and then sends an IPv6 address mapping table configuration command to the corresponding gateway. After receiving the command, the gateway maintains one IPv6 address mapping table therein, and when the data packet needing cross-domain transmission reaches the gateway, converts the data packet into a message in the IPv6 format according to this table and sends the message to the gateway of the target domain. An IPv6 address mapping table setting completion message is consistent with the route table setting completion message.

It should be stated finally that the preferred embodiments above are only for the purpose of illustrating rather than limiting the technical solution of the present invention. Although the present invention is described in details through the preferred embodiments above, those skilled in the art should understand that a variety of variations can be made to them in form and in detail without departing from the scope defined by the claims of the present invention.

What is claimed is:

1. A software-define-network (SDN)-based wireless networks for industrial automation process automation (WIA-PA) field network/IPv6 backhaul network joint scheduling method, characterized in that communication entities in the method comprise a joint controller, WIA-PA network managers, gateways and field devices; the joint controller consists of an SDN controller and a joint scheduling plugin, WIA-PA networks are uniformly managed by the joint controller, and the WIA-PA network managers only reserve a basic management function; the joint controller assigns a personal area network identifier (PAN_ID) to each network manager connected thereto for identifying different WIA-PA networks; and the method comprises following steps:
S1: establishing a connection with the joint controller actively by the WIA-PA network managers existing in the WIA-PA networks;
S2: collecting information of the WIA-PA networks of which the WIA-PA network managers are in charge by the joint controller periodically;
S3: receiving and analyzing a request for a business establishing by the joint controller to provide analyzed information;
S4: looking up a PAN_ID of a network in which a source node is located and a PAN_ID of a network in which a destination node is located according to the analyzed information;
S5: looking up information of the corresponding WIA-PA networks and nodes according to the PAN_IDs and calculating as well as assigning paths and resources, by the joint controller;
S6: sending a path and resource configuration request to corresponding WIA-PA network managers by the joint controller through interfaces;
S7: sending a mapping table of WIA-PA network addresses and IP addresses to the gateways of corresponding WIA-PA networks by the joint controller through the interfaces; and
S8: configuring the IPv6 backhaul network according to calculated results of the paths and resources by the joint controller, wherein the business establishing is completed.

2. The SDN-based WIA-PA field network/IPv6 backhaul network joint scheduling method according to claim 1, characterized in that the joint controller generates a global network topology according to a WIA-PA network topology and an IPv6 network topology, and selects an appropriate path for transmission according to the global network topology when a cross-network data transmission task needs to be established.

3. The SDN-based WIA-PA field network/IPv6 backhaul network joint scheduling method according to claim 1, characterized in that the joint controller assigns different virtual collection registry identifiers (VCR_IDs) and Route_IDs to data streams to be subjected to intra-network transmission and data streams to be subjected to cross-network transmission, and when data streams reach the gateways, the gateways rapidly distinguishes whether the data streams need to be subjected to the cross-network transmission; and the joint controller assigns corresponding resources to the data streams in the WIA-PA networks according to a type of the cross-network transmission data to provide a requirement of the cross-network transmission data.

4. The SDN-based WIA-PA field network/IPv6 backhaul network joint scheduling method according to claim 1, characterized in that the joint controller is capable of recognizing different cross-network data streams in the IPv6-based IPv6 backhaul network and providing a same with corresponding bandwidth guarantees according to a type and a priority of the data streams, and meanwhile, the joint controller supports a recognition of the data streams through matching of IPv6/IPv4 head information; and the joint controller recognizes the data streams with a flow label domain of an IPv6 head and gets types of the data streams through a communication type domain.

5. The SDN-based WIA-PA field network/IPv6 backhaul network joint scheduling method according to claim 1, characterized in that when receiving cross-network data packets, the gateways convert WIA-PA data packets into IPv6 data packets which are transmitted to the IPv6 backhaul network; and the gateways fill corresponding VCR_IDs into the IPv6 flow label domains according to a VCR table, fill a priority into communication type domains, and send the IPv6 data packets to corresponding IPv6 addresses through an IPv6 address mapping table.

6. The SDN-based WIA-PA field network/IPv6 backhaul network joint scheduling method according to claim 1, characterized in that an SDN switch in the IPv6 backhaul network in the method sets queues having different bandwidths, and the joint controller forwards data streams of different requirements to different queues to implement bandwidth guarantees.

7. The SDN-based WIA-PA field network/IPv6 backhaul network joint scheduling method according to claim 1, characterized in that interfaces for information interaction between the WIA-PA network managers and the joint controller in the method comprise following 9 types: a topology information getting interface, a device information getting interface, a device list getting interface, a device upper airway obstruction (UAO) getting interface, a route table setting interface, a superframe table setting interface, a link table setting interface, a VCR setting interface, and an IPv6 address mapping table setting interface.

* * * * *